United States Patent [19]

Anderson

[11] 3,862,303

[45] Jan. 21, 1975

[54] METHOD FOR RAPID DETECTION AND IDENTIFICATION OF SEROLOGICAL FACTORS

[75] Inventor: Norman G. Anderson, Oak Ridge, Tenn.

[73] Assignee: The United States of America as represented by the United States Atomic Energy Commission, Washington, D.C.

[22] Filed: Feb. 2, 1972

[21] Appl. No.: 223,018

[52] U.S. Cl. .................. 424/12, 23/230 B, 424/8, 424/11, 424/13
[51] Int. Cl.... G01n 9/00, G01n 31/00, G01n 33/16
[58] Field of Search .............. 424/12, 8, 11, 12, 13; 23/230 B

[56] References Cited
OTHER PUBLICATIONS

Williams et al., Methods in Immunology and Immunochemistry, Academic Press, N.Y., N.Y., 1968, pages 104–118.

Primary Examiner—Albert T. Meyers
Assistant Examiner—A. P. Fagelson
Attorney, Agent, or Firm—John A. Horan; David S. Zachry; Stephen D. Hamel

[57] ABSTRACT

Biologically neutral carrier particles in the form of very small latex beads of uniform size and density are treated with a specific serological antifactor which coats the beads, making them biologically active. The coated beads are suspended in a neutral solution and sample material suspected of containing the corresponding serological factor is then added. Following an incubation period, the solution containing the coated beads and sample material is layered over a liquid density gradient and centrifuged. Those beads with serological factor attached change in effective density and move to an isopycnic banding level different from that of the coated beads which have no serological factor attached. Following centrifugation, the density gradient is scanned to determine the banding levels of the beads therein and this information is used to indicate whether serological factor has become attached to the beads.

4 Claims, No Drawings

METHOD FOR RAPID DETECTION AND IDENTIFICATION OF SEROLOGICAL FACTORS

BACKGROUND OF THE INVENTION

The invention relates generally to serological testing and more particularly to a method for the rapid detection and identification of serological factors wherein coated latex beads are reacted and centrifuged in a density gradient to measure changes in their effective denisty. It was made in the course of, or under, a contact with the U.S. Atomic Energy Commission.

The term "serological factor" as used herein is generic to both antigens and antibodies. Moreover, it is noted that no absolute classification of a substance as an antigen or antibody is possible since antibodies produced in one animal act as antigens in another. Also, in a single individual one class of circulating antibodies may act as antigens with another class as is the case in rheumatoid arthritis.

The rapid detection and identification of antigens or antibodies in blood serum and other body fluids is an objective which, once reached, will aid greatly in the treatment and prevention of disease. Certain serological reactions useful in such detection and identification are characterized by physical aggregation of antigen and antibody or serological factor and antifactor. Tests have been devised which depend upon this characteristic aggregation being visually identifiable either grossly or when viewed through a microscope. In many instances, however, the tests as performed are not sufficiently sensitive for general use.

Some improvement in this type of test has been made by the use of biologically neutral carrier particles such as plastic beads treated with a specific serological factor which may be an antigen or antibody. The use of such beads enhances visual identification of the aggregation phenomenon due to the greater physical size of the beads. Additional improvement in identification is needed, however, where very low concentrations of the suspect antifactor result in correspondingly low levels of aggregation in a mass of unaggregated beads.

Another test has been developed which uses red blood cells coated with antigen to detect cell-bound antibodies. The coated red cells are exposed to reactive lymphocytes exhibiting cell-mediated immunity and then centrifuged in a liquid density gradient to detect changes in their effective density. The rosettes containing the two cell types experience a change in effective density upon such attachment because the density of the rosettes combining the two cell types is different from that of the coated cell or the lymphocytes alone. This change in effective density causes the rosettes to band at a level in the density gradient which is shifted with respect to the banding level of the cells used. Such shift in banding level, if sufficiently large, provides a test for the presence of specific reaction in the suspect sample.

Unfortunately, the sensitivity of the coated red blood cell test is very low where it is desired to detect small low-density particles such as protenis proteins viral antigens because the relatively large size of red blood cells limits the density change and corresponding change in banding level caused by attachement of those particles to the coated blood cells.

It is, accordingly, a general object of the invention to provide an improved method for rapidly detecting and identifying serological factors.

Another, more particular, object of the invention is to provide an improved method for rapidly detecting and identifying serological factors of very small size.

Still another object of the invention is to provide an improved method for rapidly detecting and identifying serological factors which are present in very low concentrations.

Other objects of the invention will be apparent from an examination of the following description of the invention and the appended claims.

SUMMARY OF THE INVENTION

In accordance with the invention, an improved method of detecting and identifying serological factors is provided. Biologically neutral carrier particles in the form of very small latex beads of uniform size and density are treated with a specific serological antifactor which coats the beads, making them biologically active. The coated beads are suspended in a neutral solution and sample material suspected of containing the corresponding serological factor is then added. Following an incubation period, the solution containing the coated beads and sample material is layered over a liquid density gradient and centrifuged. Those beads with serological factor attached change in effective density and move to an isopycnic banding level different from that of the coated beads which have not serological factor attached. Following centrifugation, the density gradient is scanned to determine the banding levels of the beads therein and this information used to indicate whether serological factor has become attached to the beads. The invention provides a sensitive test becasue all beads with serological factor attached band at a separate level in the density gradient where they can be observed. Latex beads are available in size and density ranges which make it possible to detect, with great sensitivity, virtually any serological factor (antigen or antibody) of interest. Using very small beads, less than 100 antibody molecules or one virus particle per bead can be detected.

DESCRIPTION OF THE PREFERRED EMBODIMENT

According to the preferred embodiment of the invention, biologically neutral polystyrene latex carrier beads are selected for treatment with an appropriate serological antifactor depending upon the particular serological factor to be detected. Proper bead selection is of paramount importance in practicing the method of the invention as it has a critical effect on test sensitivity.

One important factor in bead selection is density. Beads having densities different from that of the serological antifactor with which they are to be coated are selected so that rebanding of the coated beads will provided provide positive indication that the coating exists on the beads before they are used for test purposes. The coated bead, in turn, must have a density which differs from that of the specific serological factor which it is desired to detect. Most particles of biological interest, excluding lipids and lipoproteins, have densities which lie in the range between 1.19 and 1.7 g/cc. Carrier beads having densities, when coated, of less than 1.19 g/cc are preferable to those denser than 1.7 g/cc because less dense, and thus less viscous, liquid density gradients can be used to separate and weigh the beads following their exposure to a suspect sample. Less viscous liquid density gradients permit both shorter equilibrium times until banding of the beads occurs and lower speed centrifugation.

Bead size and uniformity are also important considerations in practicing the invention. In general it is desirable to select a bead whose size is as small as is available. Beads having diameters in the order of 0.1 μm are commercially available and have been found to satisfy the requirements of the invention in detecting a wide range of particles of biological interest. Polystyrene latex beads having an average diameter of 0.109 with a standard deviation of 0.0027 μm are available from Dow Chemcial Company and may be ordered from that company with reference to Dow Latex Batch No. LS1044-E. These latex beads have been found to band in a density gradient at a density level of 1.049 to 1.050 g/cc. Subsequent batches of latex beads produced by Dow Chemical Company or beads obtained from other sources may vary somewhat from the above size and density specifications wihtout loss of the benefits described herein, however. Improved results in terms of test sensitivity may in fact be achieved when latex beads of smaller diameter become available. Bead size uniformity is also necessary in order that equal numbers of particles of serological antifactor attach to each carrier particle during the coating process. This in turn tends to make each bead attract equal numbers of corresponding serological factor particles during a test, thereby ensuring high test resolution with the beads banding in a relatively narrow density band.

Test sensitivity is related directly to the molecular weight of the detected particle and inversely to bead size. As a general rule, beads of 0.3 μm diameter are satisfactory for determining serum proteins with molecular weights of about 1,000,000. For the range 50,000 to 200,000, the smallest beads available (about 0.1 μm) are used. Molecular weights less than 10,000 would probably require beads of 0.01 to 0.03 μm These figures are based on computations and measurements with IgG, IgM, insulin, and antiinsulin serum.

The density of the uncoated (as purchased) latex carrier beads should be greater or less, preferably less, than the density of the serological factor with which they are treated. With the density of the uncoated carrier beads thus limited, it is readily apparent that the effective density of the coated beads will be somewhere between the limiting respective densities of the uncoated beads and serological antifactor which comprises the coating. Recognizing this difference in effective density, it is possible to ascertain whether the beads have been coated by centrifuging them in a density gradient and visually observing their banding level which can be compared with the banding level of as-purchased uncoated beads.

As mentioned above, an additonal density restriction is applied to the coated beads which must be either more or less dense than the serological factor (antigen or antibody being tested for. When this restriction is satisfied, carrier beads with serological factor particles attached will have an effective density different from that of the coated latex carrier beads alone. Centrifugation in a density gradient will thus result in banding at isopycnic points which differ depending upon whether serological factor particles have become attached to the carrier beads. This distinctive "banding" of the beads provides a positive test for the presence of the serological factor.

Coating of the carrier beads may be accomplished using techniques which are well known and widely used in the aggregation tests described in the background portion of this application. Incubation of the beads in a solution containing a sufficient concentration of a specific serological antifactor is a simple but quite successful technique for achieving the desired coating. The effect of coating conditions on the density of the coated beads is illustrated by Example I.

EXAMPLE I

Polystyrene latex beads having an average particle diameter of 0.109 μm and a standard deviation of 0.0027 μm were found to band at a density of 1.049 to 1.050 g/cc in a sucrose density gradient when centrifuged in a swinging bucket rotor. A band recovery apparatus and plastic density marking beads, both of which are described in National Cancer Institute Monograph 21, pages 486–492, were used in this experiment. As little as one microgram of the particles could be seen and photographed when the material was sharply banded. In diffuse bands, at least 5 micrograms were required for detection. Five microgram samples of the latex beads were incubated 30 minutes at 56° C. with varying concentrations of human immunoglobulin (IgG) contained in a pH 8.3 borate buffer. One sample of beads not contacted with IgG was used as a control in the experiment. The highest concentration of IgG was 2,500 μg/ml and the remaining concentrations were tenfold successive dilutions in buffer of that solution with subsequent concentrations of 250, 25, 2.5, and 0.25 μg/ml being provided.

The six samples of latex beads, including the uncoated "control" beads, were placed in identical sucrose density gradients in centrifuge tubes along with density marker beads (one for each tube) and spun at 28,000 rpm for 1 hour. Samples of the density gradient in the region of the banded beads were extracted from each tube by means of a hyperdermic syringe and the respective sucrose concentration determined refractometrically. Density levels at which banding occurred and bound IgG molecules per bead are shown in the following table for each tube.

TABLE A

| Tube No. | IgG Concentration (μg/ml) Treatment Solution | Banding Density (g/cc) | Molecules IgG/Band |
|---|---|---|---|
| 1 | (uncoated) | 1.05 | 0 |
| 2 | 2500 | 1.099 | 695 |
| 3 | 250 | 1.095 | 629 |
| 4 | 25 | 1.090 | 547 |
| 5 | 2.5 | 1.077 | 354 |
| 6 | 0.25 | 1.053 | 31 |

Having selected and coated carrier beads in accordance with the above teachings, a test may be made in accordance with the subject method by performing the following steps:

1. Prepare a liquid density graident within a test tube or other container suitable for centrifugation.
2. Prepare additional gradient liquid which is equally or less dense than the light end of the density gradient and add the coated beads to this liquid.
3. Add the suspect sample to the liquid containing the coated beads and incubate as necessary to ensure sufficient factor-antifactor interaction.

4. Gently layer the liquid from step (3) over the density gradient prepared in step (1).

5. Centrifuge the density gradient including the overlayer of liquid containing the carrier beads until the beads have had time to band within the gradient (typically 1 hour).

6. Photograph or scan the density gradient to determine the banding levels of the beads in the gradient and use this information to determine whether antifactor particles have attached to the bands.

EXAMPLE II

Samples of latex beads of the type described in Example I were treated by incubation for 30 minutes in a concentration of 0.5 $\mu$g/ml of IgG. To 500 $\mu$l of beads plus IgG were added 20 $\mu$l of arthritis factor positive serum. Centrifugation in a sucrose density gradient for 1 hour at 27,000 rpm and 20° C. caused banding of the beads at a density level of 1.109 g/cc while identical coated beads which were not contacted banded at a density level of 1.090 gm/cc. Excess antibody was present in this experiment, and only a moderate increase in density resulted from the arthritis factor addition.

EXAMPLE III

Ten $\mu$g of latex beads were incubated in an excess of IgG at 56° C. for 30 minutes. The coated beads were washed by sedimenting them through a sucrose gradient and then layered over the top of a second sucrose gradient along with 20 $\mu$l of arthritis factor positive serum in 520 $\mu$l of solution. Centrifugation for 1 hour at 27,000 rpm and 20° C. caused banding of the beads to occur at a density level of 1.128 gm/cc. This demonstrates the value of washing the beads to remove excess coating or antifactor material left in solution, thus ensuring that all factor-antifactor reactions occur at the bead sites.

EXAMPLE IV

Coated latex beads were treated identically to those of Example III except that arthritis negative serum was used rather than positive serum. Centrifugation resulted in the beads banding at 1.088 gm/cc, a density level which corresponded within experimental error to that of identically coated beads which were banded without exposure to arthritis antifactor.

In the tests described in the above examples, a minimum of about $1.4 \times 10^9$ latex beads were used in each test. Light scattering measurements using near ultraviolet laser light are capable of detecting a very small number of banded antigen-bead hybrid particles separted isopycnically from the main mass of beads in a liquid density gradient. Such measurements permit the detection and identification of extremely low concentrations of serological factor in suspect samples. In order to fully realize the benefits of the invention, antibodies or antigen of high purity such as those obtained by immuno-absorption should be used to coat the beads. If a given species of antibodies represents only a very small fraction of the antibody present in the bead coating, the number of antigen particles bound per bead will be correspondingly low and sensitivity will decrease accordingly. This problem is less serious when the bound antigen is large and a single bound particle provides a significant density shift to the bead. For example, only a few antibody particles are needed to bind a single virus particle to a bead which provides an observable shift in the density and banding level of the bead.

The above description of one embodiment of the invention is offered for illustrative purposes only and should not be interpreted in a limiting sense. For example, the particular carrier beads described may be made of materials other than polystyrene latex provided that the general size, density, and uniformity restrictions described herein are adhered to. Many antigens other than those described in the specification may be detected by this method including bacterial and viral pathogens. In general, the speed and sensitivity of the method make it directly applicable to the clinically important problem of rapid identification of infectious agents.

What is claimed is:

1. A method for rapidly detecting and identifying antigen or antibody serological factors in a suspect sample to be tested comprising:
   a. coating biologically neutral polystyrene latex carrier beads with the corresponding antibody or antigen which will react with said factors, said uncoated beads being of different density than said corresponding antibody or antigen used to coat said beads, said coated beads being of different density than the corresponding antigen or antibody to be detected;
   b. contacting said coated carrier beads with said suspect sample;
   c. placing the contacted beads in a layer over a liquid density gradient;
   d. centrifuging the layer of contacted beads and liquid density gradient until the contacted beads have banded within the liquid density gradient; and
   e. examining the banding level and density of the contacted beads in said density gradient to determine whether said antigen or antibody to be detected is present in said suspect sample.

2. The method of claim 1 wherein said coated beads have densities less than 1.19 g/cc.

3. The method of claim 1 wherein said polystyrene latex carrier beads are spherical particles having average diameters of about 0.1 $\mu$m.

4. The method of claim 3 wherein said coated beads are selected to have a density less than the density of said antigen or antibody to be detected.

* * * * *